United States Patent [19]

Regan

[11] 4,267,438

[45] May 12, 1981

[54] TAMPER-PROOF ODOMETER

[76] Inventor: Thomas D. Regan, 4534 43rd Pl., N.W., Washington, D.C. 20016

[21] Appl. No.: 942,803

[22] Filed: Sep. 15, 1978

[51] Int. Cl.² ............................................. G01C 22/00
[52] U.S. Cl. .................................... 235/96; 235/117 R
[58] Field of Search ..................... 235/96, 95 R, 117 R

[56] References Cited

U.S. PATENT DOCUMENTS

| | | | |
|---|---|---|---|
| 1,809,151 | 6/1931 | Tappan | 235/96 |
| 2,117,024 | 5/1938 | Helgeby et al. | 235/96 |
| 3,482,773 | 12/1969 | Hachtel | 235/95 R |
| 3,495,773 | 2/1970 | Hachtel | 235/96 |
| 3,756,506 | 9/1973 | Inoue | 235/95 R |
| 3,785,551 | 1/1974 | Regan | 235/95 R |
| 4,015,109 | 3/1977 | Deming | 235/96 |

*Primary Examiner*—L. T. Hix
*Assistant Examiner*—Benjamin R. Fuller
*Attorney, Agent, or Firm*—Cushman, Darby & Cushman

[57] ABSTRACT

A tamper-proof odometer of the type having digit wheels mounted for rotation about a shaft by gears on gear plates separating the wheels. At least one wheel is formed, for example, by scoring so as to break when an attempt is made to pry that wheel from an adjacent wheel to reset the odometer. The shaft is grooved and end caps are fixedly attached to the shaft ends so that the shaft will break if an attempt is made to remove the caps by drilling or sawing. The caps have different cross-sections so that the shaft can be engaged in a frame in only one orientation.

9 Claims, 7 Drawing Figures

TAMPER-PROOF ODOMETER

BACKGROUND AND SUMMARY OF THE INVENTION

The invention relates to an improved odometer of the type generally used on vehicles to record mileage.

Tampering with odometers to reduce the display of mileage has long been a widespread practice in order to defraud both buyers and sellers of cars. Sellers of cars, particularly new cars, each year are cheated by reducing the mileage so that the warranty appears valid. Buyers of used cars are cheated out of hundreds of millions of dollars in buying cars which in fact have much greater mileage than the odometer shows. This latter practice in fact represents a considerable safety hazard, since the purchaser may wrongly assume that vital equipment of the automobile is in good condition, whereas in fact he would know from the correct mileage that the equipment is worn out and perhaps dangerous.

Most of the odometers in use today have a plurality of plastic digit wheels mounted for rotation about a shaft. Each digit wheel is connected to adjacent wheels by gears mounted on intervening carrier plates. Each of the wheels has a plurality of teeth extending around its periphery on one side and engaging one surface of the gear and at least a single tooth on the other side, likewise engaging a gear on the other side, so that for each complete rotation of one digit wheel, the next highest digit wheel is rotated a predetermined distance so as to display the next digit. A gear on one end of the shaft drives the lowest distance wheel to rotate all of the wheels in turn.

Even an amateur can readily reset such a conventional odometer in a few seconds. One simple technique is simply to slip a sharp object between the highest distance wheel and the next highest distance wheel to pry apart the gear and the teeth of the highest digit wheel. The wheel can then be freely rotated to any desired position. In this way, tens of thousands of miles can be removed from the odometer in a few seconds. Alternately, the odometer can be quickly removed from its assembly and the gear plates rotated to any desired position. Yet another technique is to rotate the odometer backward to reduce the displayed mileage. Alternatively, the odometer can be disassembled, the wheels set to any desired mileage and then reassembled.

A number of approaches have been suggested in the past to prevent tampering with odometers, or at least to make tampering as difficult as possible. One technique which has been used is to place a transparent sleeve over the wheel while it is in place so that a sharp instrument cannot be inserted between the digit wheels. The difficulty with this approach is that it does not prevent tampering with the odometer after it has been removed from the automobile, and such removal is normally an easy task. Another technique, as described in Hachtel U.S. Pat. No. 3,495,773, uses a strap which engages the outwardly extending prongs of the carrier plates and prevents rotation of those plates. This technique likewise does not prevent prying or tampering with the odometer after removal.

Another technique is to prevent rotation of the odometer in a backward direction; for example, a linkage between the driving gear and the first wheel can be used which permits rotation of the first wheel only in one direction. This technique alone is not effective since it does not prevent picking of the wheel or disassembly for manual rotation or rotating carrier plates.

One other idea which has found some acceptance involves placing an ink pad on the ten thousand mile wheel so that each digit on that wheel is marked with ink as it rotates. If the wheel is turned back, it is then readily apparent. The difficulty with this approach is that the ink pad dries out during long use of the automobile. Further, the ink can be easily removed from the wheel. There is nothing to prevent substitution of the marked wheel following disassembly of the device.

Yet another approach which has been suggested is to require a sixth wheel, registering in effect millions if kilometers or miles. Such wheel, of course, would prevent an honest mistake where the mileage exceeded one hundred thousand miles. The sixth wheel does not prevent ready tampering of the odometer since it can be turned back as easily as the ten thousand mile wheel.

My previous U.S. Pat. No. 3,785,551, describes a tamper-proof odometer which is an improvement of the above-described techniques. According to that patent, the shaft which mounts the digit wheels is made non-circular to prevent rotation of the gear wheels. Sleeves are affixed to the end of the shaft to make disassembly of the odometer difficult.

The present invention relates to a further improved odometer which makes tampering virtually impossible.

According to the present invention, one of the digit wheels, preferably the ten thousand mile digit wheel, is formed so that if an attempt is made to pry that digit wheel away from the adjacent wheel or to force the internal gears by application of a tangential force to the wheel, and thus reset the wheel, it will break. This provides a readily visible indication to any buyer of the car that an attempt has been made to reset the odometer. The wheel can be made of a brittle material which cannot withstand the application of a force to pry apart the adjacent wheels. Alternatively, the plastic wheel or wheels can be formed with weakened portions such as radially extending grooves to provide scoring so that the wheel will break along the grooves.

In order to prevent disassembly of the odometer, the shaft which mounts the wheels is preferably non-axially grooved, preferably transverse to the axial direction. End caps are preferably attached to the shaft by welding or some other permanent technique. If an attempt is made to cut the end cap or to drill through the shaft along the axial direction, the shaft will break, making reassembly of the unit impossible. Preferably, the end caps have different cross-sectional shapes, for example, rectangular and triangular so that when placed in the mounting structure, they can be oriented in only one direction, that is, the odometer cannot be rotated 90° or 180° to change the displayed mileage.

Of course, the odometer still can be altered by removal from the vehicle and rotating the lowest digit wheel automatically or by hand. Both of these are time consuming and difficult jobs which might well result in the breaking of the shaft in any instance. Of course, the odometer can be broken and replacement parts used to reassemble the unit. Reassembling an odometer is a difficult job in any instance and parts for odometers are not readily available. Accordingly, the present invention makes tampering by an amateur virtually impossible and tampering by a professional unattractive because of the time required and the necessity for additional parts.

Other objects and purposes of the invention will be clear from the following detailed description of the drawings.

DETAILED DESCRIPTION OF THE DRAWINGS

Figure 1:
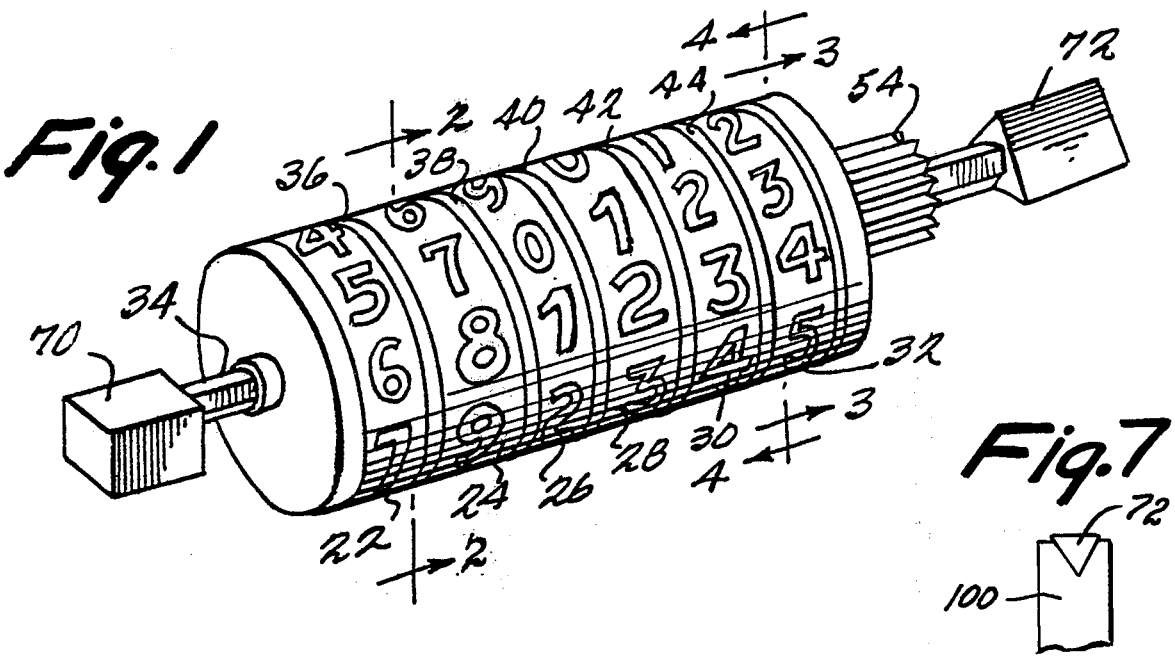
FIG. 1 shows a perspective view of an improved odometer according to the present invention.

Reference is now made to FIGS. 1-6 which illustrate one embodiment of the novel odometer of this invention. Odometer 20 includes a plurality of digit wheels 22, 24, 26, 28, 30 and 32 which display mileage, for example, up to one hundred thousand miles with digit 32 being associated with tenths of miles, digit 30 with miles, digit 28 with tens of miles, etc. If desired, an additional wheel showing hundreds of thousands of miles can be provided. Digit wheels 22, 24, 26, 28, 30 and 32 are mounted for rotation about a non-circular shaft 34 of any suitable material, preferably, metal. Wheel 22 is provided with gradually extending grooves 98 to provide scoring along which the wheel will break if prying is attempted. Shaft 34 in the embodiment of FIGS. 1-6 is made to be hexagonal, but may be of any other shape. The shaft may have a slot extending coaxially as described in my above-mentioned patent. The passage through wheels 22, 24, 26, 28, 30 and 32 is shaped so that these wheels are free to rotate about shaft 34.

Figure 2:
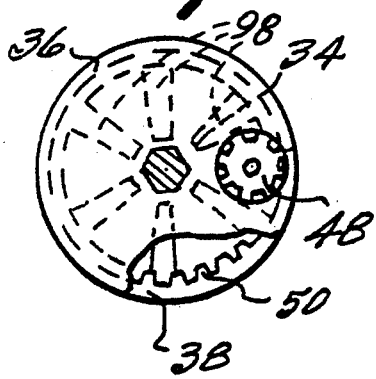
FIG. 2 shows a partial sectional view of the largest digit wheel of the odometer of FIG. 1.
Figure 3:
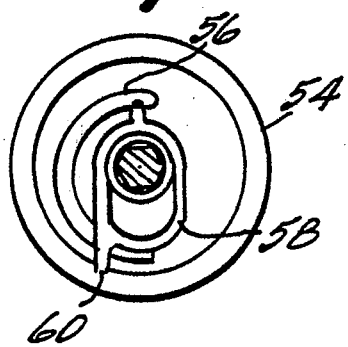
FIG. 3 shows a view of the embodiment of FIG. 1 along the lines 3—3, illustrating one arrangement for preventing backward rotation.
Figure 4:
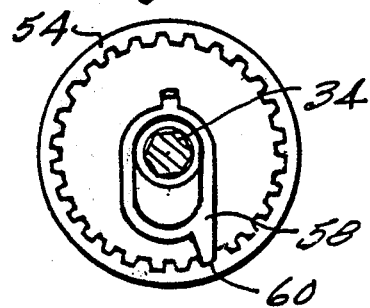
FIG. 4 shows a similar view of the arrangement for preventing backward rotation along the lines 4—4.
Figure 5:
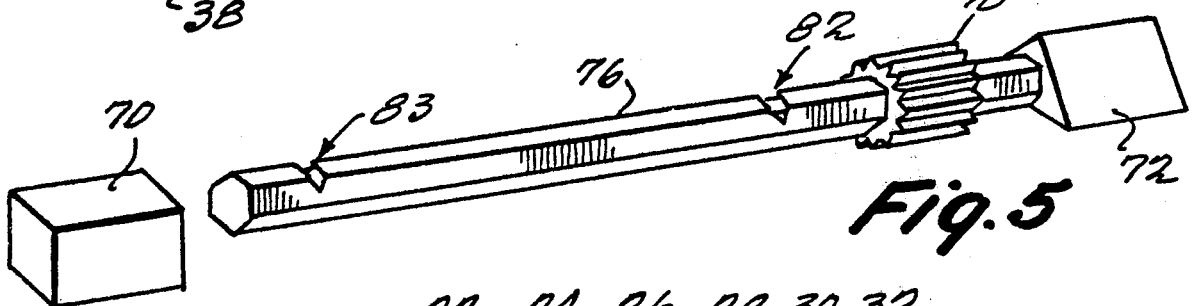
FIG. 5 shows a perspective view of the non-circular shaft and end caps.
Figure 6:
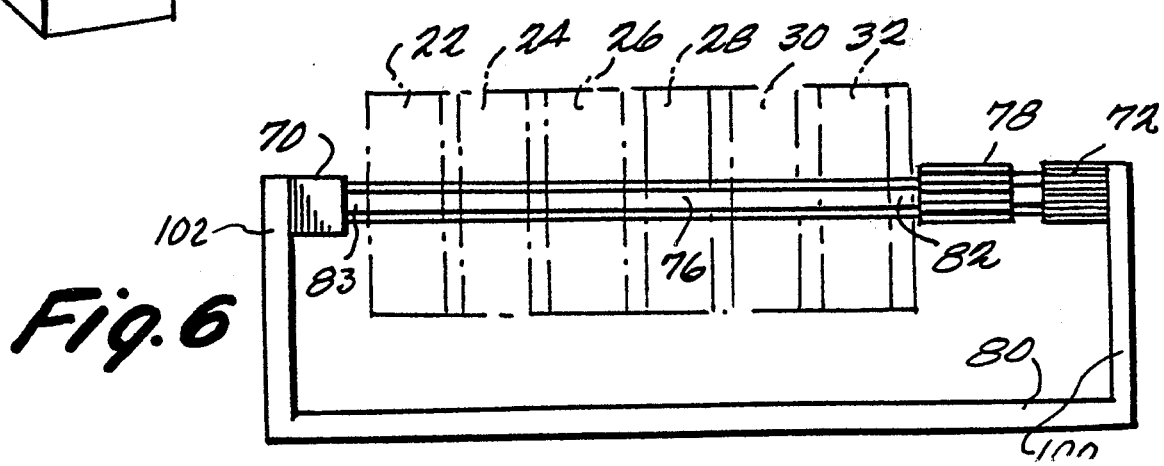
FIG. 6 shows a view of the odometer in its mounting frame.

Digit wheels 22, 24, 26, 28, 30 and 32 are separated by conventional gear carrier plates 36, 38, 40, 42, and 44, each carrying as can be seen from FIG. 2, a gear, such as gear 48. Shaft 34 has a portion matching a portion of each gear carrier plate so the plates cannot be rotated. Gear 48 includes on one side a plurality of teeth indicated as 50 which engage a plurality of teeth located about the periphery of one side of each of the digit wheels. On the other side of each of these digit wheels, is a pair of teeth which engage the teeth on the gear 48 so that for each complete rotation of an adjacent gear wheel, each gear wheel is rotated a distance which is sufficient to display the next digit. This particular arrangement of carrier plates, digit wheels and gears have been used for many years and are described not only in my above-mentioned patent, but in Hachtel U.S. Pat. No. 3,482,773. Gear member 54 is provided adjacent the smallest digit wheel 32 and drives that wheel which in turn drives the remainder of the digit wheels. Gear member 54 is provided on its inside surface with a groove 56 in which a link member 58 rides as shown. Member 58 is provided at one end with a tab 60 which engages the teeth extending about the periphery of wheel 32 on the side adjacent gear member 54. If an attempt is made to rotate gear member 54 backward, link member 58 rotates with gear member 54 and tab 60 disengages it from the teeth, preventing backward rotation of the odometer. This particular type of mechanism is described further in Hachtel U.S. Pat. No. 3,516,603. Thus it is not possible to rotate the odometer shown in FIG. 1 backward to decrement the display count. The ability to prevent backward rotation is desirable, but not necessarily required in order to provide a tamper-proof design. It is particularly important that it not be possible to separate the wheels and manually rotate them and it is important to prevent disassembly of the odometer without breaking the same.

Figure 7:
FIG. 7 shows an end view of the end cap and arm in which it is mounted.

End caps 70 and 72 are provided on opposite ends of shaft 76 and are of different outside cross-sections which match into openings in the arms 100 and 102 of frame 80 which receive the end caps of the frame 80 to ensure the shaft can be inserted in only one orientation. The connection of cap 72 and arm 100 is shown in FIG. 7. Alternately, one or both caps can be provided with a tab or the like to engage a similar cut-out on the frame arm. Any way to ensure that the shaft can only be assembled in the speedometer in one orientation can be used. End caps 70 and 72 are preferably metal, but can be made of any suitable material. These end caps, one of which may be an integral part of the shaft, should be as difficult to remove as possible, and may be welded or otherwise affixed to the shaft in a permanent manner. Shaft 76 is provided with a groove 82 which extends roughly transverse to the axial direction, although the groove may extend at an angle to that direction if desired. Application of a radial force to the shaft, for example, by a saw to cut off an end cap, will cause the shaft to break. Similarly, if an attempt is made to drill into the shaft coaxially, and remove the end cap in that fashion, the shaft will be so weakened that it will break along the groove. Groove 83 is also preferably provided at the other end of the shaft. Both grooves are preferably located adjacent to the ends of shaft 76.

The end caps 70 and 72 and the distance between the holding ends of frame 80 can be adjusted so that even if a successful attempt is made to saw off an end cap and then replace it thereafter by adhesive, the material removed by the sawing will ensure that the odometer shaft is now too short to fit properly within the frame.

Many changes and modifications in the above-described embodiment of the invention can, of course, be made without departing from the scope thereof. It is preferable, although not necessary, that the shaft have a non-circular cross-section to prevent rotation of the gear carrier plates. Alternatively, the gear-carrier plates might be welded directly to the shaft. Accordingly, the scope of the present invention is intended to be limited only by the scope of the appended claims.

What is claimed is:

1. An odometer comprising:
    a shaft;
    a plurality of digit wheels mounted in a group on said shaft for rotation to display a count and each having an outer digit displaying peripheral surface recessed surfaces bounding both sides of said outer surface with a plurality of gear engaging teeth extending around the periphery of one of said recessed surfaces and at least a single gear engaging tooth on the periphery of the other recessed surface, at least a given one of said digit wheels having weakened portions so that application of a force to separate said one wheel from an adjacent wheel causes said weakened portions of said given wheel to break;

a plurality of gear carrier plates each mounted on said shaft with each plate disposed between an adjacent pair of digit wheels and each engaging said shaft so as to be non-rotatable about said shaft;

a plurality of gears each mounted on one of said carrier plates for engaging both said teeth extending around the periphery of said one recessed surface of one of said pair of wheels and said at least one tooth on the periphery of the other recessed surface of the other of said pair of wheels so as to cause said other of said pair of wheels to advance a predetermined distance less than a complete rotation for each rotation of said one of said pair of wheels;

gear means fixedly mounted on said shaft engaging a digit wheel at one end of said group of digit wheels on said shaft for engaging and rotating that digit wheel so as to rotate each digit wheel a predetermined distance for each rotation of the digit wheel adjacent to it; and means fixedly attached to the ends of said shaft for preventing removal of said digit wheels.

2. An odometer as in claim 1, wherein said shaft has a groove extending in the periphery of said shaft on the surface of said shaft so that application of a transverse force causes said shaft to break.

3. An odometer as in claim 1, wherein said weakened portions are radially extending grooves for weakening said one wheel.

4. An odometer as in claims 1 or 2 further including a frame for mounting said shaft, wheels, plates and gears, and wherein said removal preventing means includes first and second end caps received in respective arms of said frame on the opposite ends of said shaft for preventing removal of said wheels and engaging said frame, said end caps having different cross-sections matching the receiving portions of said arms so that said caps can engage said arms in only one orientation.

5. An odometer as in claims 1 or 2 including means coupled to said gears for preventing rotation of said wheels in a reverse direction.

6. An odometer as in claims 1 or 2 wherein said shaft has portions which match portions of said gear plates to prevent rotation of said gear plates.

7. An odometer comprising:

a shaft having a groove extending in the periphery of said shaft so that application of a transverse force causes said shaft to break;

a plurality of digit wheels mounted in a group on said shaft for rotation to display a count and each having an outer digit displaying peripheral surface, recessed surfaces bounding both sides of said outer surface with a plurality of gear engaging teeth extending around the periphery of one of said recessed surfaces and at least a single gear engaging tooth on the periphery of the other recessed surface;

a plurality of gear carrier plates each mounted on said shaft with each plate disposed between an adjacent pair of digit wheels and each engaging said shaft so as to be non-rotatable about said shaft;

a plurality of gears each mounted on one of said carrier plates for engaging both said teeth extending around the periphery of said one recessed surfaces of one of said pair of wheels and said at least one tooth on the periphery of the other recessed surface of the other of said pair of wheels so as to cause said other of said pair of wheels to advance a predetermined distance less than a complete rotation for each rotation of said one of said pair of wheels; and gear means fixedly mounted on said shaft engaging a digit wheel at one end of said group of digit wheels on said shaft for engaging and rotating that digit wheel so as to rotate each digit wheel a predetermined distance for each rotation of the digit wheel adjacent to it;

means fixedly attached to the ends of said shaft for preventing removal of said digit wheels.

8. An odometer comprising:

a shaft having a a groove extending in the periphery of said shaft so that application of a transverse force causes said shaft to break;

a plurality of digit wheels mounted in a group on said shaft for rotation to display a count and each having an outer digit displaying peripheral surface recessed surfaces bounding both sides of said outer surface with a plurality of gear engaging teeth extending around the periphery of one of said recessed surfaces and at least a single gear engaging tooth on the periphery of the other recessed surface, at least a given one of said digit wheels being grooved so that application of a force to separate said one wheel from an adjacent wheel causes said given wheel to break;

a plurality of gear carrier plates each mounted on said shaft with each plate disposed between an adjacent pair of digit wheels and each engaging a portion of said shaft so as to be non-rotatable about said shaft;

a plurality of gears each mounted on one of said carrier plates for engaging both said teeth extending around the periphery of said one recessed surface of one of said pair of wheels and said at least one tooth on the periphery of the other recessed surface of the other of said pair of wheels so as to cause said other of said pair of wheels to advance a predetermined distance less than a complete rotation for each rotation of said one of said pair of wheels;

gear means fixedly mounted on said shaft engaging a digit wheel at one end of said group of digit wheels on said shaft for engaging and rotating that digit wheel so as to rotate each digit wheel a predetermined distance for each rotation of the digit wheel adjacent to it;

means coupled to said gears for preventing rotation of said wheels in a reverse direction;

first and second end caps on the respective ends of said shaft for preventing removal of said wheels without breaking said shaft, said caps having different cross-sectional areas; and a frame having arms with openings for receiving said caps so that said caps, shaft, wheels, gears and gear plates can be inserted in only one orientation.

9. An odometer comprising:

a shaft;

a plurality of digit wheels mounted in a group on said shaft for rotation to display a count and each having an outer digit displaying periphery surface recesssed surfaces bounding both sides of said outer surface with a plurality of gear engaging teech extending around the periphery of one of said recessed surfaces and at least a single gear engaging tooth on the periphery of the other recessed surface, at least a given one of said digit wheels being formed of a brittle material so that application of a force to separate said one wheel from an adjacent wheel causes said given wheel to break;

a plurality of gear carrier plates each mounted on said shaft with each plate disposed between an adjacent pair of digit wheels and each engaging said shaft so as to be non-rotatable about said shaft;

a plurality of gears each mounted on one of said carrier plates for engaging both said teeth extending around the periphery of said one recessed surface of one of said pair of wheels and said at least one tooth on the periphery of the other recessed surface of the other of said pair of wheels so as to cause said other of said pair of wheels to advance a predetermined distance less than a complete rotation for each rotation of said one of said pair of wheels;

gear means fixedly mounted on said shaft engaging a digit wheel at one end of said group of digit wheels on said shaft for engaging and rotating that digit wheel so as to rotate each digit wheel a predetermined distance for each rotation of the digit wheel adjacent to it; and means fixedly attached to the ends of said shaft for preventing removal of said digit wheels.

* * * * *